United States Patent [19]

Cancio et al.

[11] 4,217,327
[45] Aug. 12, 1980

[54] METHOD OF FORMING TEAR LINES IN PLASTIC FILMS

[75] Inventors: Leo V. Cancio; Gerald W. Miller, both of Cincinnati; Robert M. Mortellite, Hamilton; Anthony R. Steimle, Cincinnati, all of Ohio; Brian P. Peterson, Syracuse, N.Y.

[73] Assignee: Clopay Corporation, Cincinnati, Ohio

[21] Appl. No.: 890,327

[22] Filed: Mar. 27, 1978

[51] Int. Cl.$^2$ .................. B28B 11/08; B65D 65/28
[52] U.S. Cl. .................. 264/293; 264/284; 264/296; 264/320; 428/43; 428/188
[58] Field of Search ........... 428/43, 173, 188, 167; 156/257, 219; 264/331, 345, 319, 284, 293; 206/608, 612, 630; 264/296, 320

[56] References Cited

U.S. PATENT DOCUMENTS

| | | | |
|---|---|---|---|
| 2,626,302 | 1/1953 | Cox | 174/113 R |
| 3,086,692 | 4/1963 | Cage | 206/612 |
| 3,719,548 | 3/1973 | Keck et al. | 156/257 |
| 3,790,744 | 2/1974 | Bowen | 156/272 |
| 3,812,002 | 5/1974 | Lurie | 428/167 |
| 4,093,761 | 6/1978 | Taylor | 428/43 |

FOREIGN PATENT DOCUMENTS

1218318  9/1966  Fed. Rep. of Germany ............ 428/43

*Primary Examiner*—George F. Lesmes
*Assistant Examiner*—Alexander S. Thomas
*Attorney, Agent, or Firm*—Wood, Herron & Evans

[57] ABSTRACT

Plastic films or sheets having tear lines formed therein are disclosed. These films are made by forming a score along a predetermined line in the surface of a plastic film to form a tear line and then restoring the scored film surface without eliminating the line of tear. The products tear very easily along predetermined lines even though the restored plastic films have enhanced impact strengths. By restoring the surface of the scored film, score lines become invisible to the naked eye and the useful life of the film is extended. Single-ply or multi-ply products are disclosed including products having an embossed or textutred surface, still without eliminating the capability for a smooth line of tear. The products have many utilities as structural materials which may be sized or torn by hand, including wall coverings, window shade coverings, rupturable packages and envelopes, to mention a few.

7 Claims, 11 Drawing Figures

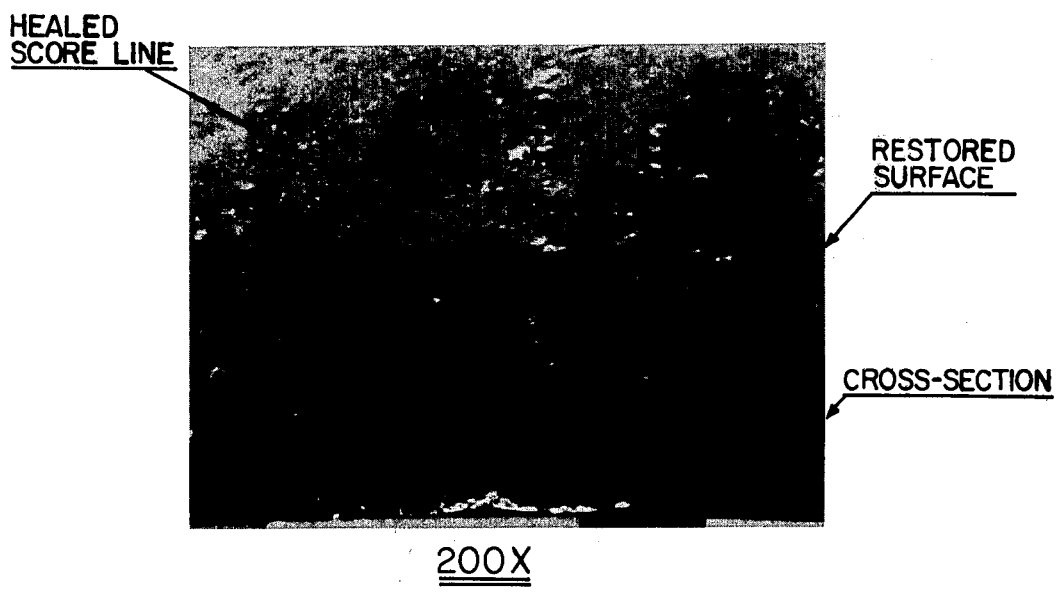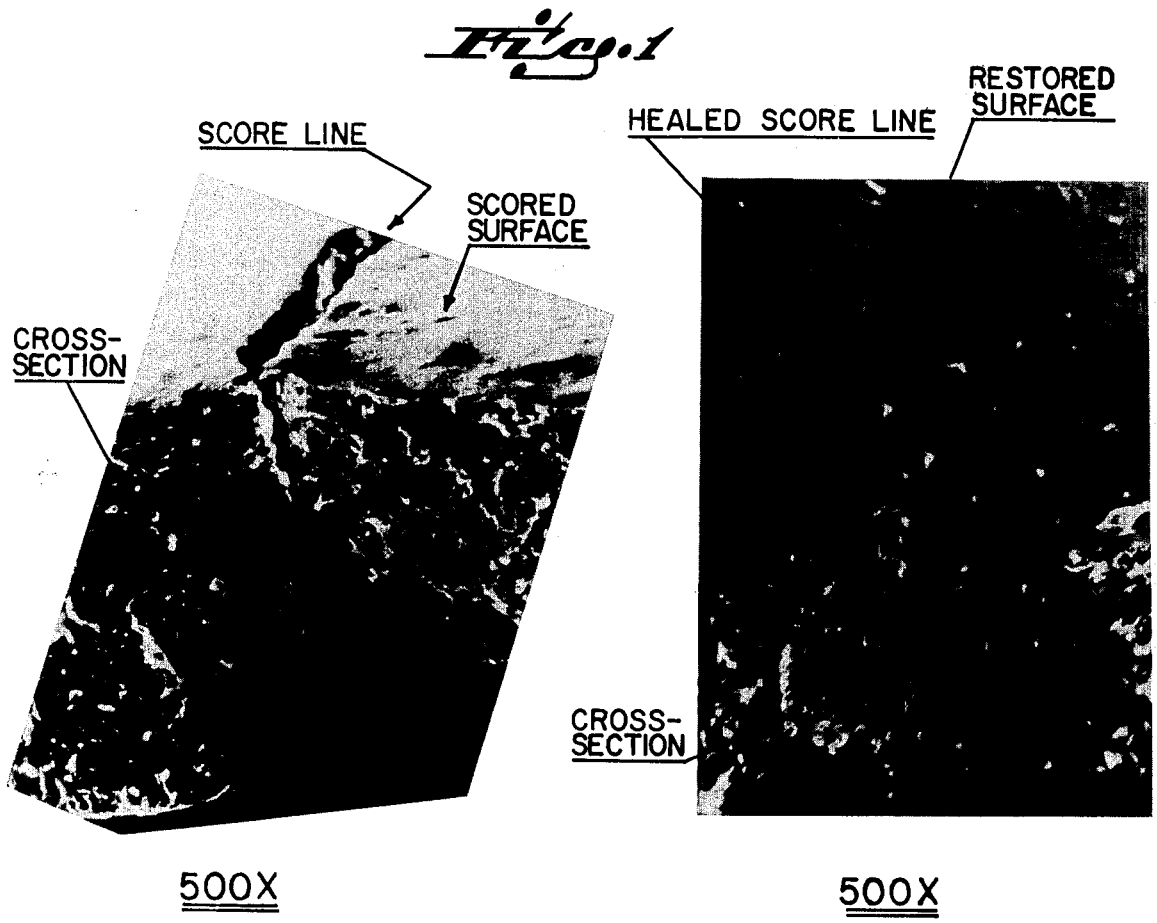

FLAW
FLAW
100X—0.5mil

200X—0.5mil

100X—1mil

FLAW
FLAW
200X—1mil

100X—2mil

200X—2mil

100X

200X

METHOD OF FORMING TEAR LINES IN PLASTIC FILMS

BACKGROUND OF THE INVENTION

Plastic sheets or films, such as polyvinyl chloride or polyethylene film, may not be torn directly along a straight or other regular line. Rather, when tearing forces are applied in opposite directions, such materials or films deform and stretch until the elastic limit is surpassed, whereupon a tear or separation starts. This tear originates anywhere in the area of the deformation, usually at the weakest point produced by the reduction in thickness, and the tear will not necessarily run normal to the tearing forces which are applied. Simply, it is virtually impossible to tear a plastic film in a straight and smooth line due to its plasticity.

The tearability of plastic sheet materials has been improved in a number of ways. These methods generally provide for an easy-tear arrangement in the film by the formation of score lines, either molded or mechanically formed in the film, alone or in combination with other tearing means. These easy-tear arrangements eliminate the need for a separate cutting tool and enable a person to tear the film along predetermined parting lines by hand. Furthermore, such easy-tear arrangements have been proposed in a number of products including bags, envelopes, adhesive tapes, packaging sheet materials or films, sizable products for shelves, walls, windows and other coverings.

Most generally tear lines are formed in plastic film by scoring or mechanically forming a groove in the plastic film. This groove may be formed by knife, chemical, solvent, extrusion, or other ways and devices. All of these techniques are directed to weakening the film along a predetermined path or line so that the plastic film is easy to tear. Such techniques of weakening necessarily reduce the overall strength of the sheet material itself. Such reduction in strength poses a number of problems or disadvantages in the end uses for the film. Other problems or disadvantages are common to a number of end uses for the scored sheet materials. For instance, in the case of known scored decorative wall coverings or window coverings for hand sizing on either a wall or in a window opening, a number of disadvantages exist. The score lines tend to be visible in the plastic sheet materials even though the lines are provided by very fine knives which cleanly penetrate the surface of the sheet material. Such visible score lines in a decorative product obviously detract from its utility and even diminish its salability. In addition, in the handling of such films, there is a problem of film fracture or splitting in the formation of the product, usually from larger supply rolls. Such splitting obviously renders useless the material from the supply roll and such material must be reprocessed at additional expense or scrapped. In use, when scored sheet materials are subjected to the environment, i.e., heat, sunlight or aging, these effects obviously are more pronounced on the thinned areas of the sheet material. Thus the lines of weakness intentionally provided for tearing the plastic also limit the useful life of the end product. The scores also provide areas for the accumulation of dirt or grime. End products are always subject to hazard of accidental tearing whereby they no longer may serve their useful function, as in the case of a window shade or decorative covering. In other areas of utilization such as the formation of bags, envelopes, adhesive tapes, packaging sheet material or films, sizable products for shelves, similar problems are encountered and, therefore, the utility of scored plastic films has been limited in these areas. There have been many efforts in the patent art to overcome these difficulties. Merely illustrative of such efforts are U.S. Pat. Nos. 2,705,579; 2,791,324; 2,811,280; 2,849,109; 3,186,628; 3,244,335; 3,379,814; 3,527,859; 3,563,839 and 3,616,990 and Great Britain Pat. Nos. 1,028,557; 1,088,564 and 1,294,652.

SUMMARY OF THE INVENTION

This invention is directed to a method of making plastic films or sheet materials having tear lines formed therein for severance along a predetermined path. According to this invention, plastic films may easily be torn with very little pressure, i.e., by hand, to sever the original film and leaving very smooth edges. The method includes forming a score along a line in the surface of a plastic film to provide a tear line and then restoring the surface of the scored plastic without eliminating the line of tear therein. It has been found that plastic film can be scored along a line and then the score may be healed or concealed by restoring the surface of the sheet material without elimination the tear line. Such restoration may take several forms depending upon the nature of the plastic and desired results, including heat and pressure embossing of the surface, heat sealing, coating, or lamination.

This invention is predicated, in part, upon the discovery that plastic films may be scored and then restored to provide increased film strengths, still with ease of tear. The restoration of the surface also affords other advantages, particularly unique and adaptable to a number of useful products referred to in the background of this invention. For instance, in the case of a plastic window shade, such healing or restoration of the scored surface enables rather unsightly score lines, otherwise detracting from the appearance and salability of such window coverings, to be eliminated. Furthermore, by restoring the strength of the scored sheet material without eliminating the line of tear, the decorative covering may be sized very easily and yet problems heretofore associated with film handling in the manufacture of the window shade, or in its use and sizing, are eliminated. In other words, this invention ables plastic sheet material, and other products, formed of plastic to be easily sized by imparting score lines in such products, without seriously jeopardizing their strength, so that they may be used and have an extended service life.

In one form of the invention, lines of weakness are provided in a plastic film by scoring along predetermined paths with a knife or series of knives. These scores are created in the film to facilitate tearing the film in a desired direction. When a number of such lines, either in parallel or intersecting fashion, are imparted to the surface of a rather thin film on the order of several mils to about 50, or more, mils in thickness, the impact strength of the film is severely weakened. However, according to applicants' technique of restoration, the impact strength can be markedly improved. In one embodiment of restoration, the surface is embossed, i.e., reformed by heat and pressure deformation. This operation involves both shear and mechanical deformation whereby the previously scored surface is healed or reformed to strengthen it and to conceal or render invisible the score lines. In this embossing technique, even though the score lines are invisible and the film is strengthened, it tears with ease. Microscopy has revealed that there are no visible score lines on the surface of the film at 80×. Under higher magnifications on the order of approximately 200×, there is evidence of a very slight discontinuous flaw in the surface. However, the surface has a layer of reformed plastic substantially covering the scores. The restoration of the surface, it is therefore to be understood, may be substantial or complete, depending upon the degree of restoration to achieve the results sought by this invention. For instance, current microscopic investigations have established clearly that the scored plastic sheet material was restored at its surface to heal the plastic and cover previously visible scoring flaws. These visual effects were also accompanied by enhancement in the strength of the plastic film. Even though the surface of the film was restored, flaws were found to exist below the surface of the material to a depth approximating the original score. These internal flaws enable the sheet material to be torn along the predetermined path imparted by scoring even though the surface has been restored.

In another embodiment, scored plastic film may be covered with a layer of the same or different material and still the tearing properties are retained. In this embodiment, a plastic sheet material is scored as in the first described embodiment by mechanical tools or knives, or by extrusion, molding or the like. Instead of embossing the surface to restore the scored film, other films or layers may be laminated with the application of heat and pressure to the scored side of the film. Furthermore, additional layers may be laminated to the underside of the scored plastic material. In either case, it has been found that the multi-ply plastic sheet products resulting from the lamination technique tear very easily along the score lines even though durable laminations have been achieved. Clean edges resulting from tears of such multi-ply plastic sheet materials have been obtained. Microscopic examination of these laminated structures demonstrates that only the inner layer of film was scored; yet easy tearing may be achieved. Further, even though the scored inner layer film may be rather thin, i.e., 1-6 mils in thickness, and is laminated to other films several times such thickness, clean separated edges can still easily be achieved by tearing the laminate. These results are considered surprising.

Unique products are also provided by this invention. Plastic films having scores for tearing can be substantially covered with a layer without eliminating the tearing capacity. Novel laminar structures are provided with tear lines. Plastic films may also be decorated on the scored surface. Films may be provided with multiple score lines and improved impact strength can be achieved. As mentioned above, these plastic sheet materials may still be easily torn with very little pressure, i.e., by hand, to provide portions of the original sheet material and leaving very smooth edges. The benefits of the invention are particularly unique and adaptable to a number of useful products. Appearance and salability of such products can be improved, along with strengths and extended service lives.

In accordance with other aspects of this invention, the restoration may be achieved by simply heat sealing the surface of the scored material. Substantial covering or healing may be achieved by corona discharge as a form of surface restoration. In addition, the surface may be film-formed or coated with suitable formulations to hide, heal or conceal the score or tear line and still without eliminating the tearability of the sheet.

Many plastic films or sheet materials are suitable for use according to the principles of this invention. Such sheet materials include thermoplastic materials such as polyethylene, polypropylene, polyvinyl chloride, cellulose acetate, nylon, vinyl resins such as polyvinylidine chloride, polyvinyl acetate, mixtures of such resins or copolymers of the mentioned monomers of such resins. Of course, such resins may be employed alone or they may be supported as mentioned above by lamination to other and different films such as regenerated cellulose, polyethylene terephthalate, metal films such as aluminum, and the like. Therefore, the term plastic film or sheet material as used herein is intended to apply to a wide variety of sheet materials of varying thickness which may be provided with score lines and whose surfaces may be restored. Such plastic materials are those which generally comprise substances capable of being shaped or molded, with or without the application of heat. Still other substrates may have plastic coatings on rather non-thermoplastic substrates. Particularly useful are high polymeric, usually synthetic materials which are film-formed by any of a variety of known techniques. Such high polymeric synthetic materials are frequently employed with other ingredients such as curatives, fillers, reinforcing agents, colorants, plasticizers, and the like. Such mixtures are capable of being formed or molded usually under heat and pressure. Thermoplastic types of such plastic materials can be resoftened to their original condition by heat, however, other plastic materials of a thermosetting type may be film-formed and are also applicable herein. The films of course may be either of a continuous nature, or impermeable, or permeable and the advantages of the invention may still be achieved. Other variations in the plastic materials capable of being employed in accordance with the principles of this invention will be understood to those of ordinary skill in the art in view of this description.

Other embodiments, variations and details of operation according to the method of this invention as well as the products resulting therefrom will be understood with reference to the following Examples and drawings in which:

FIG. 1 is a photographic representation under 200× magnification of the surface of a previously scored plastic film whose surface has been restored by embossing under heat and pressure;

FIG. 2 is a photographic representation under 500× magnification of a plastic film material of FIG. 1 prior to restoration of the scored surface showing the surface score line and partial cross-section;

FIG. 3 is a photographic representation under 500× magnification showing score line after it has been healed or restored by the embossing technique;

Figure 4A:
Figure 4D:
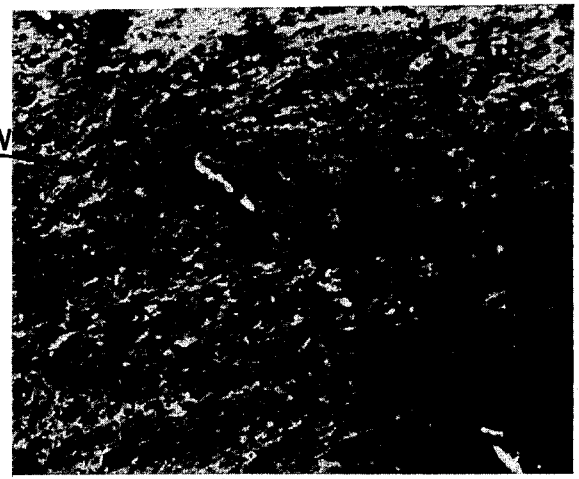
Figure 4B:
Figure 4E:
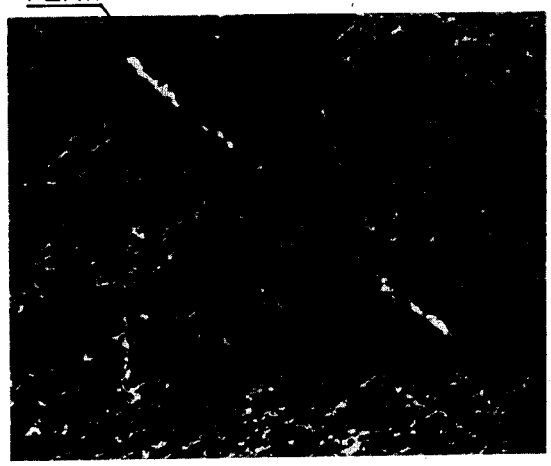
Figure 4C:
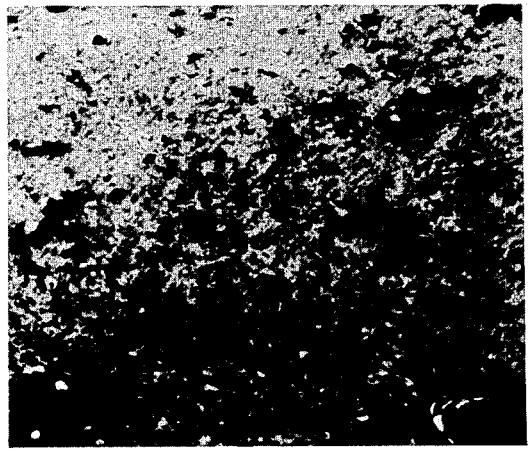
Figure 4F:
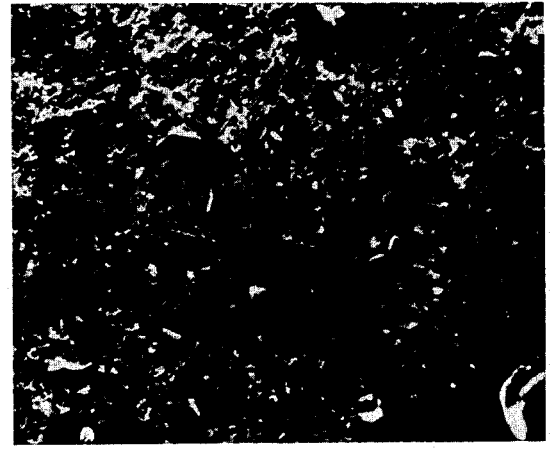
Figure 5A:
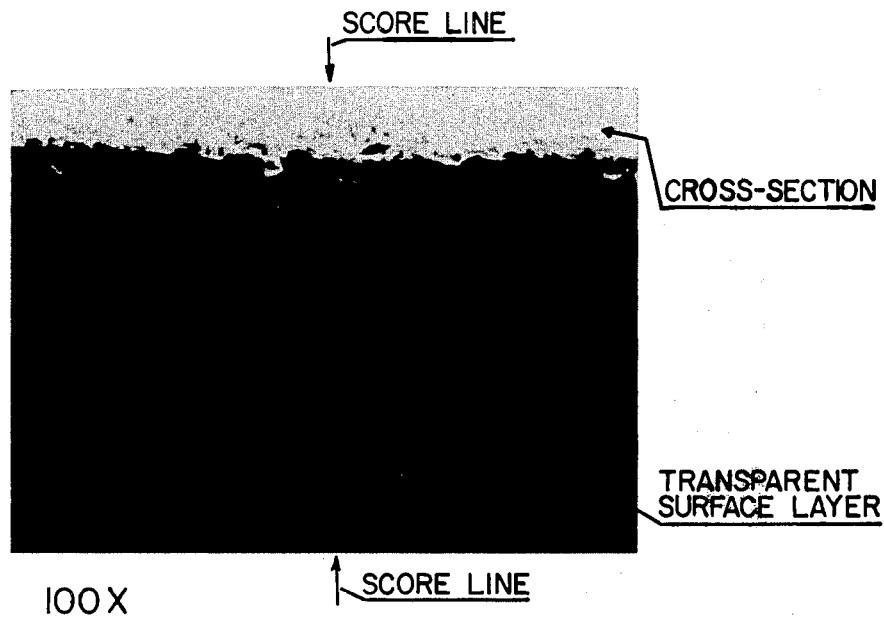
Figure 5B:
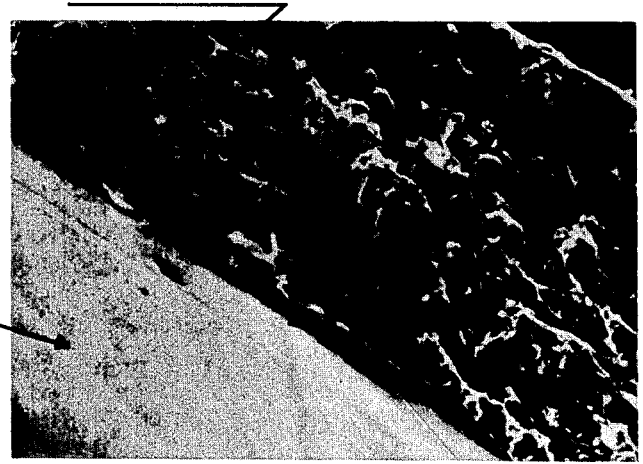

FIGS. 4A-F are a series of photographic representations under 100 and 200× magnifications, illustrating the effects of grinding off surface layers of restored scored film of the type represented by FIG. 3 and the nature of the flaws at such different depths; and FIGS. 5A-B are photographic representations under magnifications of 100× and 200× of the embodiment wherein the restorations are achieved by lamination of a film to the scored plastic.

EXAMPLE I

A 6 mil, single-ply, plasticized polyvinyl chloride film was processed according to the following technique. The precise formulation and processing conditions will vary, depending upon the specific ingredients employed in the formulation and such variations are not significant or critical to the utilization of this invention by a person of ordinary skill. Exact PVC formulations may be obtained from well known sources including the text of *Plastic Application Series, Polyvinyl Chloride*, by Harold A. Sarvetnick, Robert E. Krieger Publishing Company, Huntington, N.Y. 1977, page 243. Typically, such polyvinyl chloride formulations of calendar film and sheeting comprise approximately 100 parts of the resin, with plasticizer usually approximately 20 parts of dioctylphthalate or equivalent, with various additives, stabilizers, and the like, as well known. Such formulation details form no part of this invention. The PVC film was then stored to an approximate depth of 2 mils with knife blades. After scoring, the scored film was embossed on conventional embossing equipment under conventional conditions for plasticized PVC. Prior to embossing, the film was passed over a hot roll at temperatures on the order of about 280°–300° F., and then embossed between a 14 inch diameter engraved steel roll and a rubber roll. The plastic film material upon being introduced between the nip of the steel engraved and rubber rolls is embossed by an operation which involves both shear and mechanical deformation of the surface. The embossing pattern of course is imparted to the film material.

A sample of film undergoing the scoring operation above and reformation by embossing is characterized by the fact that the score line is invisible to the naked eye, but tears with ease. The unembossed scored film material has a score line which is visible to the naked eye. The plastic film processed by the embossing technique above described is represented by FIG. 1 which is a photographic reproduction under magnification of 200×. For comparison, as mentioned, the score line before embossing was visible to the naked eye. The score line is also shown under 500× by FIG. 2. Upon surface restoration by embossing, the score line became invisible to the naked eye, but the sheet material was easily torn. Optical microscopy revealed no visible score line on the surface of the film at 80× and evidence of a very slight, discontinuous flaw at 160×. As demonstrated by FIG. 1, under magnification of 200×, a discontinuous flaw was observed on the film surface. FIG. 2 compares the surface and cross-section (inside) under 500× of the scored starting film and FIG. 3 shows the restored surface by embossing. These photographic representations illustrate both the surface and the insides of the film. In order to expose the inisde of the film to the microscope, the film was either cut or fractured. The latter was achieved by breaking the film following exposure to liquid nitrogen. With reference to FIG. 2, the score line was highly visible, and a flaw extended about one third the thickness from the score line into the cross-section. On the other hand, only a slight surface flaw was visible on the cross-section of the sample at 500× and no evidence of an internal flaw. These photographs show that a layer is substantially formed over the score upon embossing restoration of the scored film. It should be mentioned that further studies at 500×, 1000× and 2000× failed to show any conclusive evidence of internal flaws. However, this was a difficult task, since the flaw is discontinuous, with reference to FIG. 3, and since the fractured structure is quite rough and, therefore, it was hard to distinguish between a flaw and the cross-sectional morphology. Because of these problems, further experiments dealt with surface examination.

With reference to FIGS. 4A–F, the effects of grinding about 0.5, 1, or 2 mils from the restored surface, represented by FIG. 3, were demonstrated. FIGS. 4A–C photographically represent the effects of grinding at magnification of 100×. Whereas FIGS. 4D–F represent these effects under magnification of 200×. With reference to FIGS. 4A–F, the large defect on the bottom right-hand corner of each picture represents a tear line which was manually initiated in order to identify the original score line. These photographs demonstrated a number of facts. First, that there are flaws existing in the film below the surface. In contrast to the rather continuous nature of the original score line and the surface represented by FIG. 2, after restoration at a depth of about 0.5 to about 1 mil, the flaws are not uniform in shape, but rather are in an intermittent array as demonstrated by FIGS. 4D–D and 4B–E. The flaws were not visible or hardly visible below a depth of about 2 mils (FIGS. 4C–F). With reference to the comparison of FIGS. 4A–D and B–E, the flaws near the surface of the 0.5 mil sample are smaller than the flaws shown by the area 1 mil below the surface, indicating that the embossing was effective in healing or restoring the surface defects.

Split tear values in pounds were also obtained on these samples. The values of about 0.08 pound, 0.09 pound and 0.16 pound were the tear values obtained for the films which were ground about 0.5, 1, and 2 mils, respectively. Split tear is a quantitative measure of the force required to propogate the tear through the score line. The values reported were obtained on an Instron tester at a deformation rate of about 10 inches per minute. Thus, the split tear data indicated that the samples in which flaws were evident, represented by FIGS. 4A–D and B–E, did tear easily. However, the last sample having 2 mils removed took twice as much force, i.e., three times on a pound per mil basis, to tear. As mentioned above, the flaws were not visible or hardly visible in this sample.

Therefore, the photographs of FIGS. 1–4 demonstrate quite clearly that the plastic film having a score line formed in the surface to provide a tear line is restored according to the principles of this invention by embossing the surface under heat and pressure. The restoration of the surface in the scored plastic film can be accomplished without eliminating a line of tear. Furthermore, upon sectioning the surface of the samples, it is demonstrated that the flaws have been restored to a greater degree by observance of smaller and intermittent flaws near the surface compared to deeper sections. Furthermore, below the surface the disappearance of visible mechanical flaws is related to the greater forces required to tear the film.

The following Table I compares the mechanical properties of a scored plastic film represented by FIG. 2 and a restored film of FIG. 1 according to the principles of this invention.

TABLE I

|  | FIG. 2 Film | FIG. 1 Film |
|---|---|---|
| Specific Gravity (gm/cm³) | 1.39 | 1.38 |
| Oz/sq yd | 5.80 | 5.06 |
| Gauge (mil) | 5.57 | 4.89 |
| Split Tear (#) 72° F., 50% RH |  |  |
| Initial | .089 | .068 |
| Aged one week at 140° F. | .098 | .088 |

TABLE I-continued

|  | FIG. 2 Film | FIG. 1 Film |
| --- | --- | --- |
| Aged three weeks at 140° F. | .095 | .095 |
| Impact Strength (FT-#)/mil |  |  |
| Initial | .032 | .065 |
| Aged three weeks at 140° F. | .023 | .051 |

With reference to Table I, it will be observed that the restored scored film tore as easily as the original scored film, having about the same split tear strength. However, the restored scored film had twice the impact strength of the originally scored film, i.e., 0.065 versus 0.032. Upon aging for three weeks at about 140° F., the impact strengths remained relatively the same. While it would be expected that the restored scored film will last longer and resist the attack of the elements better, present data on an accelerated basis, has not clearly demonstrated this. However, the restoration of the surface of the film provides a rather substantially continuous film formed over the surface of the score whereby soiling resistance is enhanced in the restored film. With the conventional scored film represented by FIG. 2, for example, dirt penetrates into the score lines and makes them more visible and this product is less salable.

EXAMPLE II

In further support of the operating principles of this invention, a three-ply PVC film having a thickness of approximately 8 mils was scored in the same manner as the film in Example 1 and over-embossed under temperature conditions following the same technique outlined above. Upon examination of the restored film, there were no visible score lines to the naked eye. Furthermore, the film had good tear properties approximating that of the film represented by Example 1. The film was not further characterized beyond hand tear and visual examination.

Example III

Other embodiments of this invention are demonstrated by the following examples where lamination is the method of restoration. In contrast to the foregoing examples where it may be said that a film is substantially formed over the surface of the scored platic sheet material by embossing, the following examples illustrate that such a covering or restoration can be achieved by lamination. The lamination may occur with a layer of the same or different material, yet with retention of the tearing properties.

In order to evaluate this modification, plasticized PVC laminates were prepared on a Dake Press. In this series of examples, a scored plastic film prepared according to the technique described in Example 1 was made. In all cases, a scored 6 mil single-ply PVC film was used as the scored film layer. All layers were PVC film. In order to test the various embodiments, the thickness of the top layer was varied by employing films having various gauges of between about 0.5 mil through about 6 mil. In certain cases a bottom layer was added to the structure. All structures 1-6 are described in Table II as follows.

TABLE II

| Sample | Top Layer | Middle Layer | Bottom Layer |
| --- | --- | --- | --- |
| 1 | .5 mil | Scored film | None |
| 2 | 3 mils | Scored film | None |
| 3 | 3 mils | Scored film | 3 mils |
| 4 | 6 mils | Scored film | None |
| 5 | 6 mils | Scored film | 6 mils |
| 6* | Scored film | Scored film | None |

*Scored surfaces facing each other and oriented 90° from each other.

Samples 1-6 were prepared by sandwiching the scored film in such a way that there would be plys of either double or triple layers. In Sample 1, the film was placed between the polished chrome plates of the Dake Press and a top layer of 0.5 mil PVC was located on top of the scored side of the film. The plates and sandwiched scored film were then heated at approximately 200° F. and at 500 psi for about 2 minutes. Under these conditions the adhesion between the top layer and the scored film was adequate. Under similar conditions Samples 2-6 were made. The thickness of the top layer was increased to about 3 mils in Sample 2. Whereas, in Sample 3, in addition, a bottom layer of 3 mil film was added. Sample 4 constituted a 6 mil top layer and Sample 5 had a three-ply structure of 6 mil top and bottom layers sandwiching the scored film. Sample 6 involved the lamination of scored surfaces facing each other and oriented 90° with respect to one another.

In the case of all Samples 1-6, the films were able to be torn quite satisfactorily. In the case of Sample 6, the tear was able to be achieved cleanly in either direction. The latter construction allows various modifications in the production of tearable plastic sheet material by being able to properly size rectangular and square shapes, or triangular and diamond shapes, by changing the angles of orientation. Each of the above embodiments illustrate that the restoration of the surface may be achieved by lamination and still the advantages of the invention may be secured.

With reference to FIGS. 5A and B, surface restoration by lamination as in Samples 1-6 is shown. With particular reference to Sample 1 and FIG. 5A, where the top layer of 0.5 mil was transparent, the score line as indicated by the arrows is clearly seen through the top surface of the film. The photographic representation shows the top surface of the film at a slight angle so that the edge of the film is also seen. The flaw line under the transparent film was still observable and, this tended to demonstrate that the flaw line was not heat healed after heat lamination. Of course, under lamination conditions, the flaw line may tend to be slightly softened. Nevertheless, empirically it has been demonstrated that the lamination of the continuous film to the top surface of the scored sheet material to restore the surface still does not eliminate the clear tearing propensities of the scored plastic film. With reference to FIG. 5B, under 200× by observing the surface again at a slight angle to illustrate the edge, the score line is visible through the transparent top layer. The transparent over-layer was used to ascertain the existence of the score below the surface which facilitated tearing. By increasing the thickness of the top layer even up to 6 mils, or even 18 mils, it has still been demonstrated that the overall laminate may still be easily torn. However, the impact strengths of the laminated scored film can be substantially increased to very high and desired levels. Of course, the film layers may be pigmented in order to eliminate the observable score line but still allowing the laminate to be torn. Furthermore, decorative laminates can be made with tearability heretofore unachieved.

Example IV

In a manner similar to that described in Example III, where layers of similar thermoplastic material were laminated, the following additional example was performed in which other materials demonstrated the utility of the invention. A thin layer of vacuum metalized polyethylene terephthalate film was laminated to the scored 6 mil single-ply film employed in the above examples. The scoring was achieved in a manner similar to that achieved for the 6 mil single-ply sample of Example 1. The lamination was achieved under conditions as similar to that in Examples III and the over-embossing was obtained under conditions similar to those described in Example I. The laminate was capable of being torn easily along the score lines very cleanly and smoothly. Therefore, the advantages of the invention may be achieved with other various plastic materials either of the thermoplastic, metal or similar type, or with substrates of other tearable materials.

The above description and operating examples demonstrate that new products of plastic film or sheet material may be obtained according to the principles of this invention. Employing either the embossing or lamination technique, a scored sheet material may be restored by substantially covering the scored side with a film or film-forming substance. In the case of the embossing technique under heat and pressure, the surface of the original material is reformed to form a substantially continuous layer or film on the surface to provide the additional strength and to conceal the scores. In the case of the lamination technique, the film is formed by layering a preformed plastic film under lamination temperatures and pressures to achieve multi-ply structures. As discussed above, other techniques may be obtained to restore the surface such as heating without pressure and even coating the film-forming substances onto the scored side of the plastic film to restore the surface or provide strength, along with other advantages mentioned above. Each of these embodiments demonstrates that the surface of the film is healed but a flaw is left in the material. This flaw, as exemplified by the residue of the score, as developed above, may be obtained either by mechanical implements such as knives or other instruments as well as by embossing itself. Furthermore, such scores or flaws may be achieved with other techniques as will be well understood to a person of ordinary skill in the art.

Other modifications of the invention will be understood by a person of ordinary skill in this art in view of the above description and specific operating examples.

What is claimed is:

1. A method of making plastic film having tear lines for severance thereof comprising
    forming a score along a line in a surface of a thermoplastic film to provide a tear line,
    reforming the thermoplastic material in said surface of the scored film without eliminating the tear line by the application of heat and pressure to said surface and
    forming a substantially continuous surface layer of said reformed thermoplastic to cover said score.

2. The method of claim 1 wherein the score is visible to the naked eye and is then concealed by reforming the surface.

3. The method of claim 1 wherein said sheet material has a plurality of scores forming tear lines substantially parallel to one another.

4. The method of claim 1 wherein said sheet material has a plurality of score lines which intersect one another.

5. A method of making plastic film having tear lines for severance thereof comprising
    forming a score along a line in a surface of a thermoplastic film to provide a tear line,
    reforming the thermoplastic material in said surface of the scored film without eliminating the tear line by the application of heat and pressure wherein the application includes embossing the surface with a decorative pattern to form a substantially continuous surface layer of said reformed thermoplastic to cover said score.

6. A method of making a thermoplastic film having tear lines for hand severance thereof comprising
    forming a score along the line in a surface by cutting a groove in the surface of a thermoplastic film to provide a tear line,
    reforming the thermoplastic material in the scored surface by the application of heat and pressure without eliminating the line of tear and
    forming a substantially continuous surface layer of said reformed thermoplastic to cover said score.

7. The method of claim 6 wherein a plurality of parallel grooves are formed in the surface of the film.

* * * * *

UNITED STATES PATENT AND TRADEMARK OFFICE
CERTIFICATE OF CORRECTION

PATENT NO. : 4,217,327

DATED : August 12, 1980

INVENTOR(S) : Leo V. Cancio et al

It is certified that error appears in the above-identified patent and that said Letters Patent are hereby corrected as shown below:

Column 5, line 51 "inisde" should be --inside--

Column 6, line 19 "Figs. 4D-D and 4B-E" should be
--Figs. 4A&D and 4B&E--

Column 6, line 21 "(Figs. 4C-F)" should be
--(Figs. 4C&F)--

Column 6, line 22 "Figs. 4A-D and B-E" should be
--Figs. 4A&D and B&E--

Signed and Sealed this

Twenty-eighth Day of October 1980

[SEAL]

Attest:

SIDNEY A. DIAMOND

*Attesting Officer*

*Commissioner of Patents and Trademarks*